United States Patent Office 3,709,856
Patented Jan. 9, 1973

3,709,856
PROCESS FOR POLYMERIZING FLUOROOLEFINS
Julius Eugene Dohany, Berwyn, and John Casimer Grigger, Oreland, Pa., assignors to Pennwalt Corporation, Philadelphia, Pa.
No Drawing. Filed May 21, 1970, Ser. No. 39,558
Int. Cl. C08f 3/22, 3/32, 15/06
U.S. Cl. 260—87.7
9 Claims

ABSTRACT OF THE DISCLOSURE

Fluoropolymers having good heat stability are prepared by polymerizing fluoroolefins in aqueous medium, in emulsion or suspension, using as the polymerization catalyst an initiator having the formula

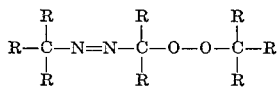

where the R substituents are lower alkyl groups which may be the same or different.

---

This invention relates to the polymerization of fluoroolefins, such as vinylidene fluoride, tetrafluoroethylene, chlorotrifluoroethylene, vinyl fluoride, hexafluoropropylene, pentafluoropropene, and the like, in aqueous medium to produce high molecular weight fluoropolymers using an alkyl peroxy azo compound as polymerization catalyst represented by the formula

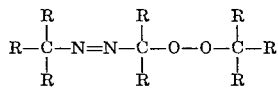

where the R substituents are lower alkyl groups, which may be the same or different, e.g., straight chain and branched chain alkyl groups having from one to six carbon atoms. In the preferred embodiment all the R substituents are methyl groups, i.e., the compound is 2-t-butylazo-2-(t-butylperoxy)propane. The preparation of this particular class of initiators is described in the application for patent of Ronald E. MacLeay and Chester S. Sheppard, S.N. 725,180, filed Apr. 29, 1968, now abandoned in favor of the continuation-in-part application of R. E. MacLeay, C. S. Sheppard and H. C. Lange, Ser. No. 88,110, filed Nov. 9, 1970.

The method of this invention is especially useful for preparing highly heat-stable, high molecular weight polymers (homopolymers and copolymers) of vinylidene fluoride and tetrafluoroethylene. The preferred copolymers include those containing at least about 50 mole percent of vinylidene fluoride copolymerized with at least one comonomer selected from the group consisting of tetrafluoroethylene, trifluoroethylene, hexafluoropropene, vinyl fluoride, pentafluoropropene and ethylene; and those containing at least about 50 mole percent of tetrafluoroethylene copolymerized with at least one comonomer selected from the group consisting of vinylidene fluoride, hexafluoropropene, trifluoroethylene, propylene, vinyl acetate, isobutylene, lower alkyl acrylates and methacrylates, and ethylene. A particularly preferred copolymer is that composed of from about 40 to about 99 mole percent vinylidene fluoride and correspondingly from about 1 to 60 percent tetrafluoroethylene.

Only a small number of the great variety of free radical-forming catalysts useful for conventional vinyl monomer polymerization have been found to be operative in fluoropolymer synthesis, and even these have serious disadvantages. For instance, an inorganic peroxy initiator, as exemplified by the ammonium persulfate-sodium sulfite redox combination (U.S. 2,435,537), yields vinylidene fluoride homopolymers and copolymers having inadequate thermal stability, poor processability (in extrusion and molding) and relatively poor mechanical properties (caused by an excessively high molecular weight). The use of certain organic peroxides, such as di-tertiary butyl peroxide (U.S. 3,193,539), produces a higher quality polymer than the inorganic peroxy type, however, there is a danger of explosion involved, especially in the production of vinylidene fluoride-tetrafluoroethylene copolymers, resulting from an unpredictable "disproportionation" reaction and extremely rapid pressure buildup in the autoclave that tends to occur in these systems. Diisopropyl peroxydicarbonate is known to be useful for catalyzing vinylidene fluoride polymerization (U.S. 3,475,396) but this system has disadvantages involving the handling of a catalyst in solid form that can spontaneously explode at room temperature and therefore must be stored under refrigeration.

It has now been discovered that the use of the liquid azo peroxy catalyst as embodied herein for fluoroolefin polymerization solves the foregoing problems; the polymerization reaction is conducted with a high degree of safety to produce a thermally stable, readily processible, high quality fluoropolymer. A major use of the high molecular weight fluoropolymers thus produced, and especially vinylidene fluoride homopolymers and copolymers is for forming thin protective (chemical and weather-resistant) coating on a substrate such as steel, aluminum or wood. The usual techniques for preparing such a coating involve laying down a film on the substrate of a dispersion of fluoropolymer particles in an organic latent solvent system by spraying, dip coating or by doctor blade. The coated material is inserted in an oven and the film is dried and cured at from about 120° C. to about 320° C. These techniques are described, for example, in U.S. Pats. Nos. 3,111,426; 3,240,744; and 3,324,069. Another important use of the fluoropolymer products is as material for extrusion and molding operations to produce specialty pipe, valve parts, panels for vessel construction, and various other shapes and fabricated objects.

In carrying out the process of this invention, a measured amount of water (desirably deionized and deoxygenated), a dispersing agent and the azo peroxy catalyst are charged to an autoclave equipped with a suitable stirring device and temperature control means, followed by the addition thereto of from about 7 to about 40 parts of monomer or monomers mixture per 100 parts by weight of the aqueous media. The polymerization reaction is carried out within the temperature range of about 0° C. to about 150° C., preferably from 10 to 60° C., at pressures within the range of about 100 to about 1000 p.s.i., preferably from 250 to 700 p.s.i.; for from about 1 to 4 hours, to obtain yields of polymer, based on monomer charged, on the order of about 40 to 90%. The amount of catalyst used is from about 0.1 to 5%, based on the weight of the monomers, preferably in the range of 0.75 to 2 weight percent.

The dispersing agent may be a conventional fluoroalkyl surfactant, in which case the polymerization involves an aqueous emulsion system that will produce finely-divided fluoropolymer particles having a size distribution with the range of about 0.1 to 0.5 micron. The amount of such surfactant used is on the order of 0.005 to 1 percent based on the weight of the aqueous medium. Representative fluoroalkyl surfactants are typified by the formula $ZR_fA$ where Z is fluorine or chlorine, $R_f$ is a perfluoroalkyl group having from 6 to about 12 carbon atoms and A is a hydrophilic group selected from the class consisting of COOM, OPO(OM)$_2$, and OSO$_2$(OM) where M is hydrogen, an alkali metal, ammonium or lower alkyl-substituted ammonium. Such surfactants are well known compounds, being described in the literature, for example, in U.S. Pats. Nos. 3,156,732; 3,232,970; 3,351,644 and British Pat. No. 1,092,141.

The dispersing agent used in the polymerization method may be of the suspending agent type, in which case the fluoropolymer will be produced as large discrete particles within the size range of about one micron up to about 500 microns. The amount of suspending agent used is from about 0.01 to 1 percent, based on the weight of the aqueous medium. Representative suspending agents are methyl cellulose, polyacrylic acid, polyvinyl alcohol, polyvinyl pyrrolidone, polyethylene oxide, and cellulose derivatives and the like. The preferred suspending agents are methoxylated propoxylated cellulose as described in U.S. 2,538,051 and polyoxyalkylene polyol-diepoxide reaction products as described in U.S. 2,990,396.

A chain transfer agent can be included in the aqueous reaction medium to obtain a lower molecular weight polymer than would be produced in its absence. Representative of such agents are primary, secondary and tertiary alcohols, e.g., tert-butyl alcohol and isopropanol; ketones such as acetone and methyl ethyl ketone; and halogenated hydrocarbons, e.g. chloroform and carbon tetrachloride, and others well known in the art. The amount of the chain transfer agent can vary from 0.01 to 1 percent of the weight of the monomers.

Following substantial completion of the polymerization reaction, evidenced by substantial pressure drop in the reactor, the fluoropolymer can be separated from the aqueous phase, if desired, by filtration (in the case of an emulsion system after coagulation by conventional procedures), followed by water-washing and drying to produce the product in the form of powdery, discrete particles within the particle size ranges previously set forth.

Representative examples are presented below to illustrate the method of this invention and to demonstrate the improved results achieved therewith. The heat stabilities of the fluoropolymers are measured by a standard oven test in which 11 grams of powdered polymer in an aluminum dish is held in an oven at 270° C. for one hour, air-cooled, compared with color standards and rated as either excellent, very good, good, fair-plus, fair, or poor. The molecular weights of the polymers are gauged by determining the "plasticity number," an empirical index related to melt flow. The plasticity number is the area in square millimeters of a plaque made by placing 0.5 gram of polymer powder piled in a cone between the platens of a Carver press heated to 225° C. The platens are brought together to compress the powder under slight pressure (less than 50 p.s.i.) between the heated platens and the powder is preheated in this manner at 225° C. for 30 seconds. A pressure of 2500 p.s.i. is then applied for sixty seconds at platen temperature of 225° C. The greater the area of the plaque so produced, the lower the molecular weight of the polymer, and conversely.

EXAMPLE 1

A horizontal, stainless steel, autoclave reactor equipped with a paddle agitator is charged with 5000 parts by weight deionized water and 0.05% (based on weight of the water) of dispersing agent, the reaction product of polyethylene glycol and diepoxide (as described in U.S. 2,990,396), "Carbowax 20 M," a product of Union Carbide Corporation. The reactor is sealed and evacuated, purged with nitrogen, and, again evacuated to remove all traces of oxygen. Ten parts of 2-t-butylazo-2-(t-butylperoxy) propane is added under a blanket of nitrogen. A total of 735 parts of a comonomers mixture of 50 mole percent of vinylidene fluoride and 50 mole percent tetrafluoroethylene is fed in and reacted at a pressure of 425 p.s.i.g. and temperature of 35° C. to 50° C. over a period of 2 hours. A pressure drop to about 150 p.s.i.g. at this time indicates completion of the reaction, and the autoclave is vented and cooled. 472 parts of polymer is recovered (after vacuum filtration, water-washing, and drying in a forced air oven at 110–115° C.) as a white fluffy powder. The heat stability of the polymer of this example is measured and rated as good. The plasticity number of the polymer is 4200. This equimolar vinylidene fluoride-tetrafluoroethylene copolymer has a desirably high melting point of about 200° C. However, it may be advantageously melt processed to contrast to tetrafluoroethylene homopolymer which must be fabricated by sintering.

EXAMPLE 2

The technique of the previous example is repeated with the proportions in the recipe being 4500 parts water containing 0.05 wt. percent of the dispersing agent of Example 1, 500 parts octafluorocyclobutane, 5 parts of the said azo peroxy catalyst, and 1390 parts of the monomers mixture. The reaction pressure is 250 p.s.i.g., temperature is 40° C. and reaction time 4.25 hours. 1206 parts of polymer is recovered having a plasticity number of 1925, indicating a relatively lower molecular weight. However, the heat stability rating of the polymer is "good."

EXAMPLE 3

The above technique is employed using as the reactor a vertical, one-gallon autoclave with a high speed impeller agitator, and as the recipe; 2590 parts water containing 0.1 weight percent of the aforedescribed dispersing agent, 148 parts 1,1,2-trichlorotrifluoroethane, 3 parts of azo peroxy catalyst, and 680 parts of the fluoromonomers mixture. The reaction pressure is 250 p.s.i.g., temperature is 40° C. and reaction time is 3.83 hours. 449 parts polymer product is recovered as a fine gritty powder that is dense and free flowing. The polymer's plasticity number is 2200.

EXAMPLE 4

The procedure of Example 1 is followed with the recipe and charge of ingredients being 6000 parts water containing 0.5% methoxylated propoxylated cellulose ("Methocel 65 HG," product of Dow Chemical Company) as dispersing agent, 480 parts 1,1,2-trichlorotrifluoroethane, 18 parts of the azo peroxy catalyst used in Example 1, and 880 parts vinylidene fluoride monomer. Reaction pressure is 650 p.s.i.g., temperature 35–40° C., and reaction time 1.75 hours. 393 parts of vinylidene fluoride polymer having a plasticity number of 8175 is recovered as very fine, free-flowing beads.

EXAMPLES 5–12

The procedure of Example 1 is followed in a series of attempted polymerization reactions to prepare equimolar vinylidene fluoride-tetrafluoroethylene copolymers with the exception that various other free radical forming catalysts are substituted in the recipe for the representative azo peroxy initiator. No polymerization reaction is initiated using any of the following compounds t-butyl peroxy-maleic acid; acetyl cyclohexane sulfonyl peroxide; di(2-ethylhexyl) peroxydicarbonate; t-butyl peroxypivalate; 1,1,3,3-tetramethyl butylperoxy pivalate; and 4-t-butylazo-4-cyanovaleric acid. With the use of each of the following compounds, reaction is initiated but is not sustained for more than 0.25 hour, resulting in only a small conversion of the monomer: di(sec-butyl)peroxydicarbonate and dicyclohexylperoxydicarbonate and the HCl salt of 2,2′-diguanyl-2,2-azopropane.

The foregoing results illustrate and confirm the unusual specificity and general inoperability of catalysts in fluoroolefin polymerization.

We claim:
1. In the process of preparing a high molecular weight vinylidene fluoride polymer by the polymerization of monomer in aqueous medium, the improvement comprising using as the polymerization catalyst an initiator having the formula

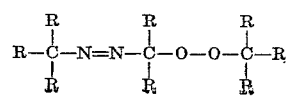

where the R substituents are lower alkyl groups, and conducting the polymerization at temperatures within the range of about 10° C. to 60° C. and pressures within the range of about 100 to about 1000 p.s.i.

2. The process according to claim 1 wherein the initiator is 2-t-butylazo-2-(t-butylperoxy)-propane.

3. The process according to claim 1 wherein the vinylidene fluoride polymer is a homopolymer of vinylidene fluoride.

4. The process according to claim 3 wherein the initiator is 2-t-butylazo-2-(t-butylperoxy)-propane.

5. The process according to claim 1 wherein the vinylidene fluoride polymer is a vinylidene fluoride/tetrafluoroethylene copolymer.

6. The process according to claim 5 wherein the initiator is 2-t-butylazo-2-(t-butylperoxy)-propane.

7. The process according to claim 5 wherein the vinylidene fluoride-tetrafluoroethylene copolymer is composed of from about 40 to about 99 mole percent vinylidene fluoride.

8. The process according to claim 7 wherein the initiator is 2-t-butylazo-2-(t-butylperoxy)-propane.

9. The process according to claim 1 wherein the pressure is within the range of 250 to 700 p.s.i.

References Cited

UNITED STATES PATENTS

| | | | |
|---|---|---|---|
| 2,471,959 | 5/1949 | Hunt | 260—89.5 |
| 3,265,678 | 8/1966 | Hecht | 260—92.1 R |
| 3,282,912 | 11/1966 | Benzing | 260—158 |
| 3,428,618 | 2/1969 | Cook | 260—92.1 R |
| 3,474,085 | 10/1969 | MacLeay | 260—192 |
| 3,524,839 | 8/1970 | Margulis | 260—92.1 R |

JAMES A. SEIDLECK, Primary Examiner

C. A. HENDERSON, Jr., Assistant Examiner

U.S. Cl. X.R.

260—80.77, 92.1, 192